US011539558B1

(12) United States Patent
Pandya et al.

(10) Patent No.: US 11,539,558 B1
(45) Date of Patent: Dec. 27, 2022

(54) HIGH INSTANTANEOUS BANDWIDTH AUTO-INDEXING PARALLELIZED CHAOTIC WAVEFORM DATA MODULATOR AND DEMODULATOR WITH TEMPORAL AUTOMATIC GAIN CONTROL, INCREASED PATH DIVERSITY AND SEQUENCE LOCK UP PREVENTION

(71) Applicant: NORTHROP GRUMMAN SYSTEMS CORPORATION, Falls Church, VA (US)

(72) Inventors: Ameesh N. Pandya, Los Angeles, CA (US); Armin Azizian, Manhattan Beach, CA (US); Christopher W. Walker, Rancho Palos Verdes, CA (US); Marlon Marquez, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 16 days.

(21) Appl. No.: 17/374,515

(22) Filed: Jul. 13, 2021

(51) Int. Cl.
*H04L 27/00* (2006.01)
*H04J 13/00* (2011.01)
*H04B 1/69* (2011.01)

(52) U.S. Cl.
CPC .............. *H04L 27/001* (2013.01); *H04B 1/69* (2013.01); *H04J 13/0018* (2013.01); *H04B 2001/6904* (2013.01)

(58) Field of Classification Search
CPC . H04L 27/001; H04B 1/69; H04B 2001/6904; H04J 13/0018
See application file for complete search history.

(56) References Cited

U.S. PATENT DOCUMENTS

| | | | | |
|---|---|---|---|---|
| 8,351,484 | B2 * | 1/2013 | Michaels | H04K 1/10 375/141 |
| 2012/0250783 | A1 * | 10/2012 | Terry | H04L 27/001 708/200 |
| 2018/0084581 | A1 * | 3/2018 | Terry | H04L 5/006 |

OTHER PUBLICATIONS

U.S. Appl. No. 16/851,552, filed Apr. 17, 2020, Ameesh N. Pandya, "All Digital Non-Conventional Chaotic Communication Systems for Resilient Communications and Signaling".

\* cited by examiner

*Primary Examiner* — Sung S Ahn
(74) *Attorney, Agent, or Firm* — John A. Miller; Shumaker, Loop & Kendrick, LLP

(57) ABSTRACT

A transmitter for a chaos communications system employing chaotic symbol modulation that perform auto-indexing, temporal gain control, increased path diversity and sequence lock up prevention. The transmitter includes a symbol mapper that converts a series of information bits to a series of bit symbols, and a chaos modulator providing chaotic spreading modulation of the bit symbols. The chaos modulator includes a plurality of chaos generators, one for each bit symbol, providing a chaos sequence for the bit symbols. Each chaos modulator includes a RAM/ROM that provides auto-indexing where a chaos sequence output from the RAM/ROM is fed back to an input of the RAM/ROM from which a chaos sequence at a next address in the RAM/ROM is selected as the output of the modulator.

17 Claims, 4 Drawing Sheets

HIGH INSTANTANEOUS BANDWIDTH AUTO-INDEXING PARALLELIZED CHAOTIC WAVEFORM DATA MODULATOR AND DEMODULATOR WITH TEMPORAL AUTOMATIC GAIN CONTROL, INCREASED PATH DIVERSITY AND SEQUENCE LOCK UP PREVENTION

BACKGROUND

Field

This disclosure relates generally to a transmitter for a spread-spectrum or chaos communications system where the transmitter includes chaos generators that perform auto-indexing and, more particularly, to a transmitter for a spread-spectrum or chaos communications system where the transmitter includes chaos generators that perform auto-indexing, temporal automatic gain control, increased path diversity and sequence lock up prevention.

Discussion of the Related Art

Digital communications systems typically map or translate a stream of encoded information bits to be transmitted into a constellation of symbols, where each symbol defines a group of the bits. For example, a bit mapper may employ M-ary phase shift keying (M-PSK) that provides in-phase and quadrature-phase bits for each symbol that is transmitted. The mapped symbols are then modulated onto a waveform, filtered and converted/up-converted to an analog signal for transmission. When the analog signal is received by a receiver, the signal is converted to a digital signal to remove the carrier and the digital signal is demodulated to recover the bit symbols, which requires knowledge of the time and position of the individual symbols in the signal to correctly determine the value of each symbol. The information bits are then extracted from the bit symbols.

For certain applications, it is desirable to transmit a data or communications signal without the signal being detected by someone else, such as an adversary, i.e., the adversary does not know that a signal is being transmitted, typically for various low probability of interception/low probability of detection (LPI/LPD) communications applications. One approach is to spread the energy of the transmitted signal, which would normally be transmitted over a relatively narrow frequency band, over a wide frequency band or spectrum, known in the art as direct-sequence spread-spectrum processing, so that the signal energy is washed out in the background and is not readily detectable. Conventionally, spread spectrum systems use a pseudo-noise (PN) sequence for spreading information bits in conjunction with traditional modulation techniques, such as M-PSK, M-ary quadrature amplitude modulation (M-QAM), etc., for the purposes of transmission. Although these techniques do bury the signal below the noise floor, they cannot hide the features that adversaries can detect. A sub-approach for spread-spectrum processing includes spreading the signal with a chaotic sequence to spread out the energy of the transmitted waveform. The modulation techniques employed for the chaotic spread signal is typically conventional modulation and coding, such as M-PSK, M-QAM, etc., which allows a straightforward synchronization between the modulated bits transmitted by the transmitter and the bits received by the receiver using conventional demodulation and decoding. However, employing conventional modulation and coding techniques in a digital communications system reduces the effectiveness of a chaotic spreading of the transmitted signal. Therefore, benefits can be obtained by providing all chaotic spreading and modulation of the information signal in these types of communications systems.

It is well-known that signals with LPI and LPD provide valuable features to communication systems. By definition, information signals can be transmitted or received without being intercepted or detected. Similar to direct sequence spread spectrum (DSSS), but more importantly code division multiple access (CDMA) signals, tens and even hundreds of chaotic signals may share a common RF channel, where each have their own unique chaotic sequence, in order to achieve spectral reuse without any interference. In particular, signals without cyclostationary properties are essential to yielding LPI/LPD features since these signals cannot be detected with sophisticated detection schemes that look for cyclostationary properties.

DETAILED DESCRIPTION OF THE EMBODIMENTS

The following discussion of the embodiments of the disclosure directed to a transmitter for a chaos communications system where the transmitter includes chaos generators that perform auto-indexing, temporal gain control, increased path diversity and sequence lock up prevention is merely exemplary in nature, and is in no way intended to limit the disclosure or its applications or uses.

Figure 1:
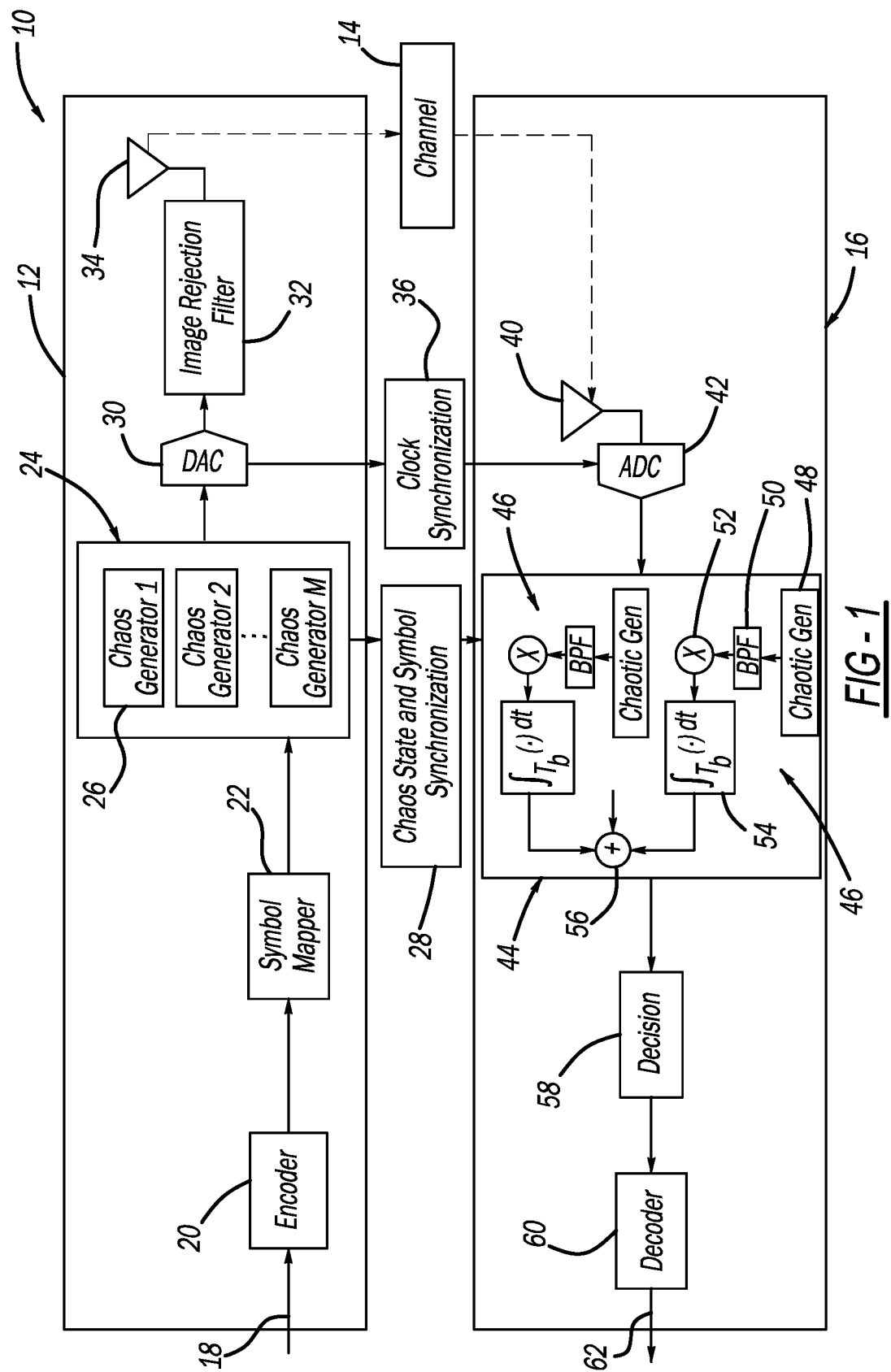
FIG. 1 is a schematic block diagram of a chaos communications system employing chaotic modulation and coding, and including a transmitter having a chaos modulator with a chaos generator for each symbol that performs auto-indexing and a receiver that employs correlators to recover the transmitted chaotic signal.

FIG. 1 is a schematic block diagram of a chaos communications system 10 that includes a transmitter 12 that transmits an encoded data and/or information signal over a communications channel 14, such as a wireless communications channel, that is received by a receiver 16. The communications system 10 is intended to be used for any application that can benefit from spread-spectrum signal processing. The transmitter 12 includes an encoder 20, such as a forward error correction (FEC) encoder that provides a channel coding scheme, such as convolutional coding, Reed- Solomon coding, low-density parity-check (LDPC) coding, turbo coding, etc., to add redundant bits to the information bits provided on line 18 to be transmitted for error correction purposes and provides a stream of encoded information bits. The encoded information bits are sent to a symbol mapper 22 that translates the bits into a constellation of bit symbols, such as two-bits per symbol, four-bits per symbol, etc., in a manner well understood by those skilled in the art.

The symbols are then modulated by a digital chaos modulator 24 that may employ, for example, an M-ary chaotic shift keying (M-CSK) architecture, to represent the symbols as a chaotic sequence of values that spreads the energy of the symbols across a wider spectrum to be below the noise floor, where m-bits per symbol mapping corresponds to the M-CSK, and where $M=2^m$ represents the number of symbols. In this embodiment, the modulator 24 employs a separate chaos generator 26 for each of the M symbols. For example, mapping two-bits per symbol provides modulation as 4-CSK and employs four of the chaos generators 26. Each of the chaos generators 26 generates a unique symbol, for example, for 4-CSK, the symbol 00 is provided by one of the chaos generators 26, the symbol 01 is provided by another one of the chaos generators 26, the symbol 10 is provided by another one of the chaos generators 26, and the symbol 11 is provided by another one of the chaos generators 26. The selected chaos spreading factor that determines how much the symbols are spread out, i.e., the number of chips or samples per symbol, for the generators 26 sets how many chaos (spreading) bits are used to represent a symbol. Specifically, for a spreading factor of length L, a symbol is represented by L number of chaos bits or samples. For example, for a spreading factor of length 512, each symbol is represented by 512 chaos bits or samples. The next time a symbol is repeated, the generator 26 starts with chaos bit $(r-1)·L+1$, where r is the symbol repetition number. If a symbol is being represented for the first time, then the generator 26 starts with chaos bit or sample 1, if the symbol is represented a second time, then the generator 26 starts with chaos bit or sample L+1, etc. The chaotic sequences are selected in such a manner that they will never repeat for a given application. The chaos bits or samples are arranged in frames and padded with preamble bits and a synchronization function that aids the receiver 16 to determine the chaos state used for the transmission and hence, helping with symbol synchronization for recovery of the transmitted data. Since the synchronization period is smaller, traditional synchronization techniques can also be employed, if desired, with the low risk of being detected. A selector (not shown) selects which of the symbols that has been spread out by the modulation process is output from the modulator 24 at any particular point in time.

The chaotic modulated symbols are then sent to a digital-to-analog converter (DAC) 30, such as a high speed interpolating DAC or delta-sigma DAC, that modulates the digital signals onto an analog waveform and that takes advantage of the available Nyquist zones to establish the offset carrier before transmission. Note that the analog signal can be up-converted to a higher frequency, if desired, but not required with the appropriate choice of DAC and Nyquist zone. The analog signal is then filtered by an image rejection filter 32 that removes replicas generated by the DAC 30 and transmitted by an antenna 34, such as an omni-directional antenna, for example, a whip or dipole antenna, or a directional antenna, for example, an AESA or reflector antenna, onto the channel 14.

The transmitted signal on the channel 14 is received by an appropriate antenna 40 in the receiver 16, down-converted to a lower frequency, if up-converted in the transmitter 12, and then converted to a digital signal by an analog-to-digital (ADC) converter 42 to extract the symbols that were transmitted. The receiver 16 first performs signal acquisition based on a local look-up table and the transmitter ID and then tracking is performed using the receiver ID. A de-spreading and de-modulation operation is performed on the received signal in a correlation processor 44 that includes a number of correlators 46 providing the desired resolution, for example, three or more correlators in parallel for the quick search at the start of the frame. Each correlator 46 receives the digital sequence or samples that are sent to a chaos generator 48, similar to the chaos generators 26, to remove the chaotic sequence. The digital sequence or samples are then filtered by a band-pass filter 50, multiplied by a multiplier 52 and integrated by an integrator 54 in a known manner by the correlation process. The correlated bits from each of the correlators 46 are then added in a summation device 56. A soft or hard decision processor 58 removes the bits from the symbols and a decoder 60 removes the redundant bits to provide the information bits on line 62 using known processes from the literature.

As mentioned above, in order for the receiver 16 to be able to extract the transmitted symbols as discussed herein, transmitter and receiver synchronization and data transmission tracking is required using, for example, chaos state and symbol synchronization 28. Synchronization between the DAC 30 and the ADC 42 and hardware clocks is accomplished by transmitting an acquisition or preamble sync pulse from the transmitter 12 to the receiver 16 to phase lock the DAC 30 and the ADC 42 using, for example, clock synchronization 36. The preamble sync pulse can be generated by a conventional approach such as by using quadrature-phase shift keying (QPSK) for a short period of time, a chaotic approach such as by using a differential chaos shift keying (DCSK) sync pulse for a short period of time or an inverse chaos approach using an RF analog sync pulse. Chaos state synchronization for the chaos generators 26 can be accomplished by transmitting a sync pulse from the transmitter 12 to the receiver 16. For data transmission tracking, the correlation processor 44 can use a threshold detector to determine if a signal exists.

Figure 2:
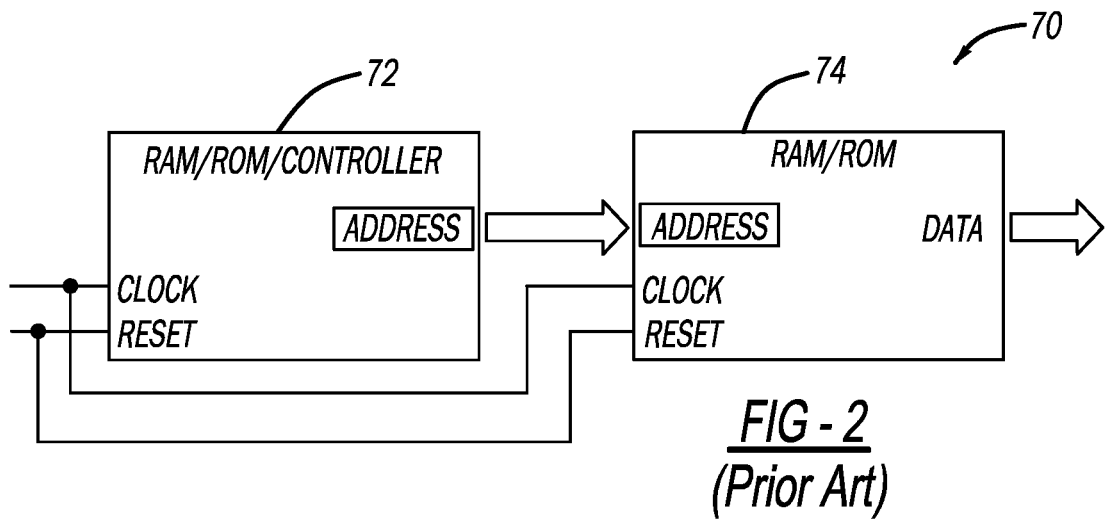
FIG. 2 is a block diagram of a known chaos generator including a controller providing address sequences to a RAM/ROM.
Figure 3:
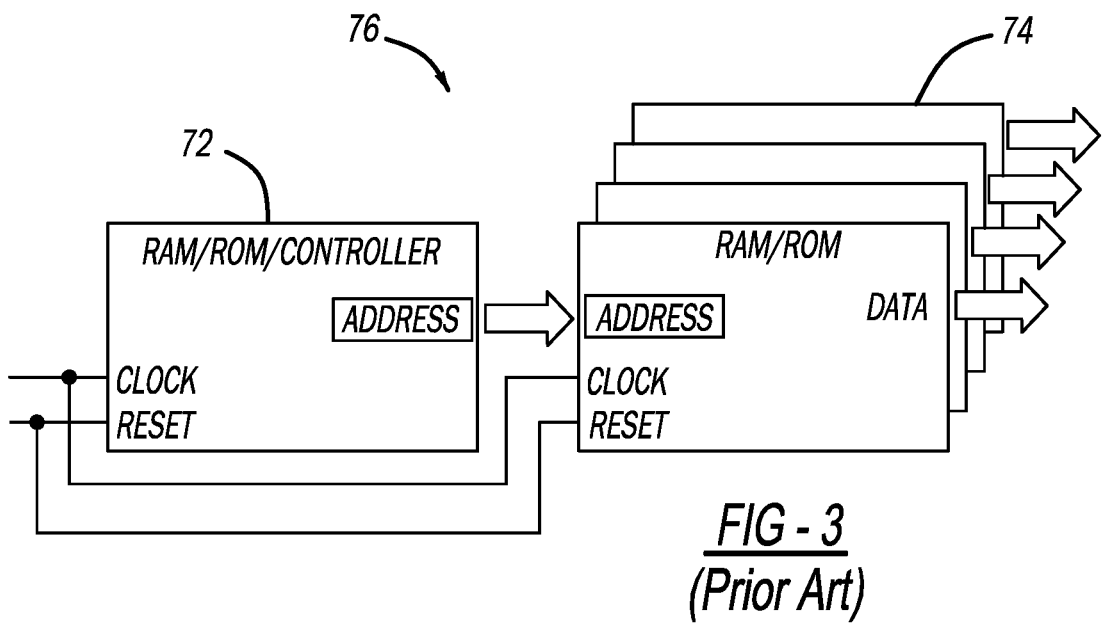
FIG. 3 is a block diagram of a known chaos generator including a controller providing address sequences to multiple RAM/ROMs.

The chaos generators 26 could be traditional arbitrary waveform generators that includes a controller/state machine that provide the address (index) sequences to a RAM/ROM to produce the pre-programmed sequence. FIG. 2 is a block diagram of a known chaos generator 70 including a controller 72 providing address sequences to a RAM/ROM 74 that outputs a chaos sequence illustrating this design. If higher instantaneous bandwidth is required, multiple RAM/ROMs can be employed as shown by chaos generator 76 in FIG. 3. Although the chaos generators 70 and 76 provide a widely used simple chaos generation technique, they are throughput limited in a real time chaotic sequence generation method due to floating point to fixed point rounding that produces a single overloaded sequence as compared to a real time arbitrary chaotic sequence.

Figure 4:
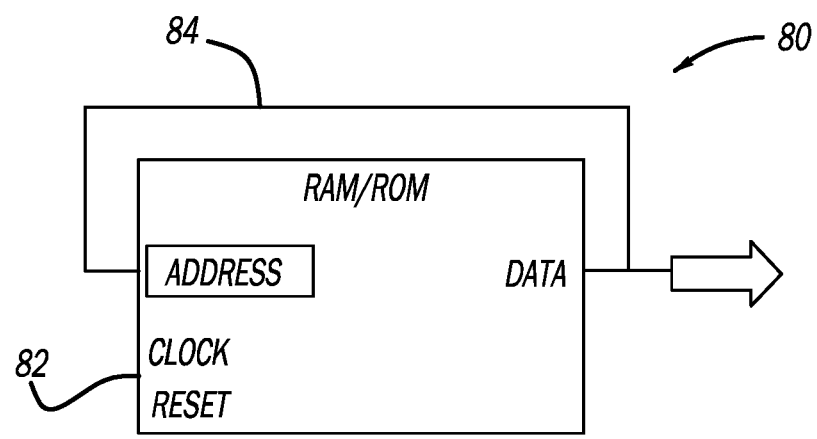
FIG. 4 is a block diagram of an auto-indexing chaotic arbitrary waveform generator.

For low instantaneous bandwidth chaotic sequences, such as $x_{n+1}=1-2x_n^2$, it is possible to modify the traditional arbitrary waveform architecture to be auto-indexing by eliminating the controller and connecting the data output to the data input so that the data output is the next address index. FIG. 4 is a block diagram of a chaos generator 80 that can be used as the chaos generator 26 that includes a RAM/ROM 82 showing this type of auto-indexing where the data output is fed back on line 84 to the data input from which the RAM/ROM indexes to the next address to output the chaos sequence at that address, thus providing the auto-indexing. This provides a significant increase in system speed, as well as a reduced RAM/ROM footprint to produce the same chaos sequence. Further, the same performance of the auto-indexing approach may be achieved with a tremendous increase in the required RAM/ROM footprint due to the chaotic symbol length requirements.

The auto-indexing chaos generation approach significantly improves signal generation timing as compared to the traditional chaos generation approaches. The elimination of the controller has high value in highly parallelized architectures by eliminating the latency and throughput limitations associated with controller/RAM/ROM architectures. The chaotic sequences do not have detectable cyclostationary features observed in other spread spectrum schemes, such as DSSS or CDMA. The output of the chaotic waveform generator produces extremely broad (GHz class) signals that appear as noise to observers without knowledge of the chaotic processing. The chaotic waveform generator also provides higher expected system computation look-ahead throughput versus the traditional controller/RAM/ROM architecture and lower expected RAM/ROM footprint due to arbitrary symbol start/stop length. The application of a temporal automatic gain control with non-linear chaotic signals to improve received signal power provides improved received signal power of chaotic sequences. A fixed-point sequence path diversity optimization provides reduced detectable features and improved chaotic data space usage. Sequence lock up prevention prevents fixed-point lock up.

Figure 5:
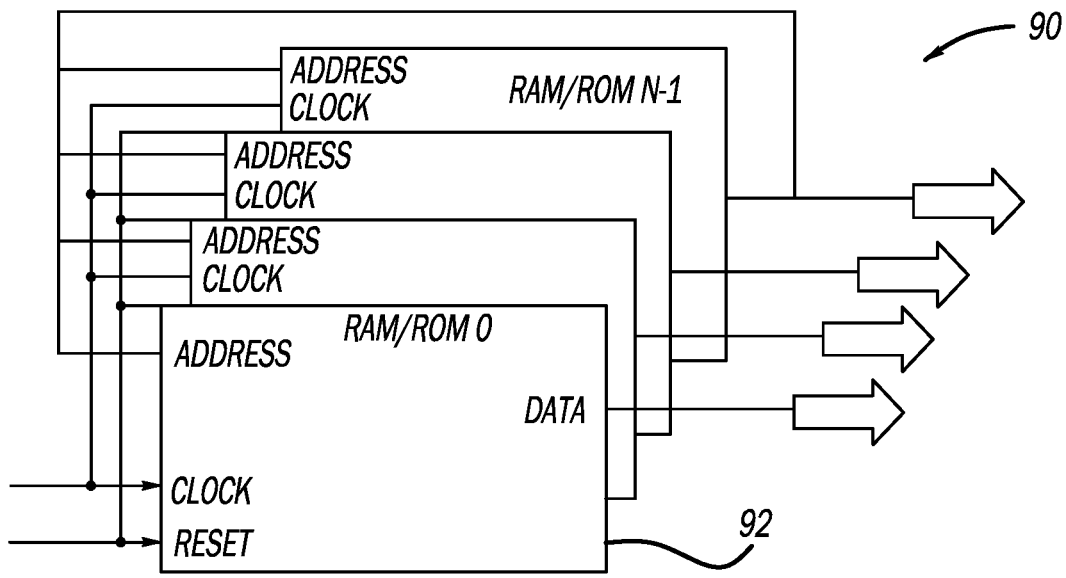
FIG. 5 is a block diagram of a series of auto-indexing chaotic arbitrary waveform generators.

FIG. 5 is a block diagram of an auto-indexing chaos data generator 90 having a series of RAM/ROMs 92 and that is capable of operating in a parallel data generator mode to meet high instantaneous bandwidth requirements. For an example with 16 bit data having a parallelization level of 4 outputs per clock, where in the initial state [data=0000000000000000], the first RAM outputs sample X[0], the second RAM outputs sample X[1], the third RAM outputs sample X[2], and the fourth RAM outputs sample X[3]. Assume sample X[3] is 010110011100011 (11,491 decimal). At the next clock cycle, the first RAM will output X[11,491], the second RAM will output X[11,492], the third RAM will output X[11,493] and the fourth RAM will output X[11,494]. This auto sequencing continues until the chaotic symbol samples are completed. It is noted that special care needs to be taken in the rounding process to ensure no lock-up conditions occur.

Figure 6:
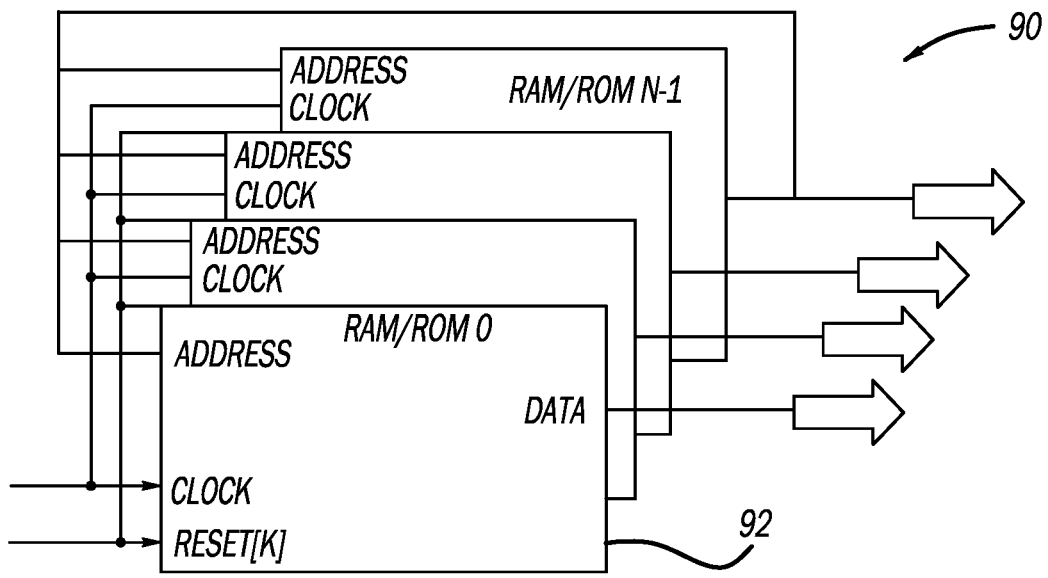
FIG. 6 is a block diagram of a series of auto-indexing chaotic arbitrary waveform generators with multiple start phases.

FIG. 6 is a variation of the generator 90, but where the auto-indexing is performed with multiple start phases. As discussed, auto-indexing RAM/ROM tables are governed by the initial state of the system as set by a RESET signal. This initiates the parallel playback of the chaotic sequence on all of the RAMs/ROMs. For RAMs/ROMs programmed a-priori with the correct sequence and at the end of the first clock cycle, the N−1 RAM/ROM output serves as the next clock cycle address for all of the RAMs. In the multiple start phase scheme, multiple start phases by a multi-bit RESET [K] allows for potentially improved cycle stationary performance by not starting the sequence stream with the same initial phase all of the time.

Unlike DSSS and traditional CDMA signals, which have prominent cyclostationary features, chaotic sequences follow what appears to be "noise-like" sequences or patterns. DSSS pseudo random generator sequences similar to GPS have well known predictable mathematical functions, such as chip spreading codes. Chaotic waveforms, however, do not generally follow the predictable features available for DSSS/CDMA, such as the spreading chip sequence, as they would produce cyclostationary features that would be a negative feature for chaotic sequences. Challenges of implementing a high instantaneous bandwidth, fixed-point chaotic sequences include the ability for the hardware to "look ahead" with the required high parallelization for high instantaneous bandwidths, feature lock up prevention when generating fixed point sequences, path dependent (Trellis) or sequence repetition due to fixed point precision idiosyncrasies, and providing automatic gain control to provide a near constant envelope sequence.

The auto-indexing provides data trellis path optimization to increase path diversity. Due to fixed-point precision rounding, a particular sequence sub-block may be replayed multiple times in a given chaotic symbol block. By judiciously modifying the quantized data patterns, increased diversity can be achieved, which reduces the potential form small spectral features. The auto-indexing has application for temporal automatic gain control with non-linear chaotic signals to improve received signal power. A sequence of N data samples are used to create a chaotic symbol. Due to the chaotic nature of the data, it is possible that the output data has very low power output. The temporal automatic gain control can be used to normalize the data to create a higher powered output to improve receive signal-to-noise ratio (SNR).

Directly implementing the chaos generator equation in hardware, even if it were capable of meeting required throughput of 16 samples per clock cycle, may cause feature lock up when generating fixed point sequences due to rounding and truncation idiosyncrasies. For example, in the chaos equation $x_{n+1}=1-2x_n^2$ discussed above, when $x_n$ is a sufficiently small value, its corresponding fixed-point representation may be rounded to −1, producing a lock up condition. Consequently, this causes $x_{n+1}$ to be −1 too, and thus the sequence will lock up. Using a look ahead technique and pre-computing samples will alleviate this issue. For example, in a 12-bit scheme, when $x_n$=−4.8828E-4 (binary 111111111111), $x_{n+1}$ will be −1 (binary 100000000000) which leads to sequence lock up. In the look ahead technique, all calculations are done as double precision floating-point before getting rounded to be read in hardware. Therefore, the $x_{n+1}$ value used to compute $x_{n+2}$ would actually be −0.999998092651822, which will not cause sequence lock up. Once all the sequences are calculated, the final results are converted to fixed-point.

Additionally, at the end of the current clock cycle's production of 16 samples, the micro-sequencer state machine needs to be capable of "looking ahead" and start the next 16 sample sequence, etc. The novel part of the micro-sequencer is that the address location, for example, 0000-1111 in the example below, is the data. To further optimize the design, an additional column is added to the end of each RAM address containing the next address. This will eliminate the possibility of multiple RAM addresses pointing to the same next address. It also guarantees that the entire chaos table will be used and repeats will be avoided. Mathematically, it would be an equivalent of having a long chaotic sequence, breaking it up into segments, randomly reordering the segments and transmitting the re-ordered randomized segments.

A micro-sequencer loading operation is performed, where the micro sequencer will be loaded using the following data flow, where there is a separate micro-sequencer for each bit pair or symbol. The micro-sequencer loads the auto-indexing machine and then the auto-indexing machine is selected. A floating-point sequence is computed and then a fixed point sequence is computed and loaded into the RAM. Next, an additional column at the end of each RAM address will contain the next address, which will eliminate the possibility of multiple RAM addresses pointing to the same next address. Thus, the last sample will no longer be the next address, but rather there will be an explicit next address stored in the RAM (last word Stored in the current address). This also prevents lock up.

The transmitter circuit operates as follows. Every two user bits (B1B0) will be spread into K modulation samples, such as K=1024 DAC samples at 4 Gsps. Given a N bit quantization (e.g. 16 bits. 1 sign bit plus 15 value bits), the starting address for the symbol used may be B1B0 concatenated with N−2 zeroes, such as B1B0&00000000000000 (B1B0 followed by 14 zeroes), although other starting addresses may be used. The number of parallelization planes per clock (P) is the number of samples produces every slow speed clock sample, such as 16 samples at 250 MHz to achieve 4 Gsps. For a B1B0 starting address and 16-bit quantization, 00, 0000000000000000b, 01, 0100000000000000b, 10, 1000000000000000b, and 11, 1100000000000000b.

P unique RAMs operate in parallel to produce the required number of samples per clock. The Pth RAM (RAMs 1 . . . P) value will be adjusted and copied to a column RAM to have the value for the next clock cycle. The rationale behind the P+1 RAM is to prevent rounding path or trellis lock ups, and to expand the usage of the $2^N$ sample entries.

At the completion of clock 0, the next address for the P group of RAMs will be the value stored in the column RAM. The process continues until all K samples are transmitted. Given the set of K samples, K outputs (Kavg) are averaged, and all samples are multiplied by $2^{(N-1)}$/Kavg. If any of the resultant samples exceed $2^{N-1}$, Kavg is increased by 1, which reduces the AGC value. The process is continued until all K AGC normalized samples have values equal to or below $2^{N-1}$.

As discussed above, generation of the chaotic sequence for transmission can be summarized as follows. The system determines that it wants to, for example, transmit two bits. The two bits identify which of many chaotic sequences having many samples will be transmitted as the bits. The bits also determine which chaos generator will generate the chaotic sequence, where the sequence has been processed to provide automatic gain control, does not have a lock up property and has no continuities.

Figure 7:
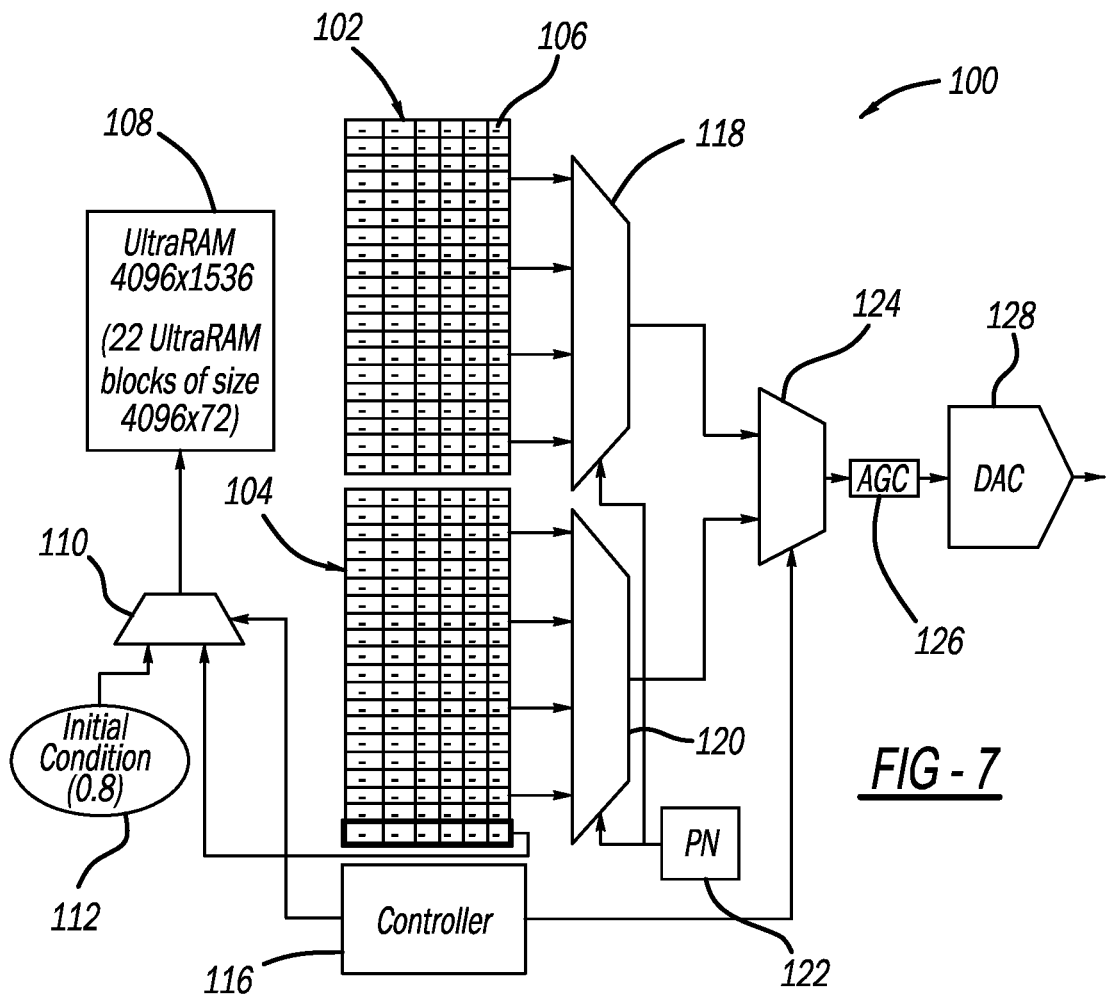
FIG. 7 is a top level block diagram of a transmitter that employs auto-indexing, temporal automatic gain control, increased path diversity and sequence lock up prevention.

FIG. 7 is a schematic block diagram of a transmitter circuit 100 that performs the operations discussed above. Two sample tables 102 and 104 having a number of chaotic sequence samples 106 each having a certain number of bits and a unique address are stored in a RAM 108. A last sample in the table 104 is selectively provided to a multiplexer 110 along with an initial condition 112. A controller 116 selects the initial condition 112 at the beginning of the transmission and then selects the last chaotic sequence sample from the table 104 as the auto-indexed chaotic sequence. The RAM 108 outputs the auto-indexed chaotic sequence for the symbols 00, 01, 10 and 11 to two multiplexers 118 and 120, where a PN block 122 selects the symbol to be output from the multiplexers 118 and 120 and sends redundant sequences to a multiplexer 124 controlled by the controller 116 to select the desired sequence. The gain of the selected sequence is controlled by an AGC 126 and then converted to an analog signal by a DAC 128 for transmission.

Figure 8:
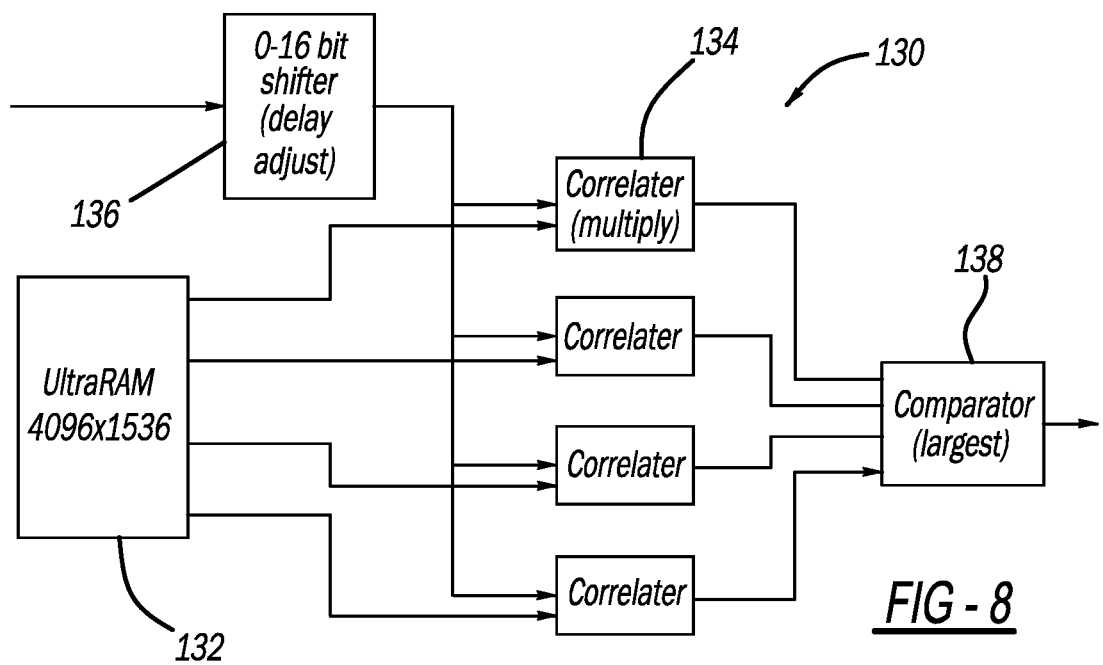
FIG. 8 is a top level diagram of a receiver that receives the signal from the transmitter and employs correlators to recover a transmitted chaotic signal.

FIG. 8 is a schematic block diagram of a receiver circuit 130 including a RAM 132 that is the same or similar to the RAM 108 and stores the chaotic sequence samples. The RAM 132 provides the chaotic sequence sample for each of the symbols 00, 01, 10 and 11 to a separate correlator 134 that operates in the same manner as the correlators 46. The analog signal from the transmitter is converted to a digital data signal by an ADC (not shown) and the digital data stream is delayed by a delay device 136 and then sent to the correlators 134. Each correlator 134 multiplies the data stream and the sample, and a comparator 136 outputs the largest of the multiplied values as the correct sample.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A transmitter for a chaos communications system, said transmitter comprising:
   a symbol mapper that converts a series of information bits to a series of bit symbols; and
   at least one chaos generator providing a chaos sequence for each bit symbol, said at least one chaos modulator having a RAM/ROM that provides auto-indexing where a chaos sequence output from the RAM/ROM is fed back to an input of the RAM/ROM from which a chaos sequence at a next address in the RAM/ROM is selected as the output of the generator.

2. The transmitter according to claim 1 wherein the at least one chaos generator is a plurality of chaos generators.

3. The transmitter according to claim 1 wherein the RAM/ROM includes an additional column at the end of each RAM address that prevents chaos sequence lock up.

4. The transmitter according to claim 1 wherein the at least one chaos generator converts floating-point chaos sequences to fixed-point chaos sequences.

5. The transmitter according to claim 1 wherein the auto-indexing is governed by an initial state set by a RESET signal.

6. The transmitter according to claim 1 wherein the auto-indexing is performed with multiple start phases.

7. The transmitter according to claim 1 wherein the transmitter further includes a temporal automatic gain controller (AGC) that controls the gain of the chaos sequence for transmission.

8. A transmitter for a chaos communications system, said transmitter comprising:
   a symbol mapper that converts a series of information bits to a series of bit symbols; and
   at least one chaos generator providing a chaos sequence for each bit symbol, said at least one chaos modulator including a RAM/ROM that provides auto-indexing where a chaos sequence output from the RAM/ROM is fed back to an input of the RAM/ROM from which a chaos sequence at a next address in the RAM/ROM is selected as the output of the generator, wherein the RAM/ROM includes an additional column to the end of each RAM address that prevents chaos sequence lock up, the at least one chaos generator converts floating-point chaos sequences to fixed-point chaos sequences, and the transmitter further includes a temporal automatic gain controller (AGC) that controls the gain of the chaos sequence for transmission.

9. The transmitter according to claim 8 wherein the at least one chaos generator is a plurality of chaos generators.

10. The transmitter according to claim 8 wherein the auto-indexing is governed by an initial state set by a RESET signal.

11. The transmitter according to claim 8 wherein the auto-indexing is performed with multiple start phases.

12. A method for communications comprising:
   converting a series of information bits to a series of bit symbols; and
   generating a chaotic sequence for transmission for each bit symbol that includes auto-indexing where a chaos sequence output from a RAM/ROM is fed back to an input of the RAM/ROM from which a chaos sequence at a next address in the RAM/ROM is selected as the next chaotic sequence for the bit symbol.

13. The method according to claim 12 wherein the RAM/ROM includes a shadow register that prevents chaos sequence lock up.

14. The method according to claim 12 further comprising converting floating-point chaos sequences to fixed-point chaos sequences.

15. The method according to claim 12 further comprising providing temporal automatic gain control (AGC) to controls the gain of the chaos sequence.

16. The method according to claim 12 wherein the auto-indexing is governed by an initial state set by a RESET signal.

17. The method according to claim 12 wherein the auto-indexing is performed with multiple start phases.

\* \* \* \* \*